(12) United States Patent
Azar et al.

(10) Patent No.: US 11,329,535 B2
(45) Date of Patent: May 10, 2022

(54) MANUFACTURING METHOD FOR A SEGMENTED STATOR OR ROTOR OF AN ELECTRICAL MACHINE

(71) Applicant: Siemens Gamesa Renewable Energy A/S, Brande (DK)

(72) Inventors: Ziad Azar, Sheffield (GB); Alexander Duke, Sheffield (GB)

(73) Assignee: SIEMENS GAMESA RENEWABLE ENERGY A/S

( * ) Notice: Subject to any disclaimer, the term of this patent is extended or adjusted under 35 U.S.C. 154(b) by 248 days.

(21) Appl. No.: 16/799,878

(22) Filed: Feb. 25, 2020

(65) Prior Publication Data
US 2020/0280247 A1    Sep. 3, 2020

(30) Foreign Application Priority Data

Mar. 1, 2019   (EP) .................................... 19160279

(51) Int. Cl.
*H02K 15/00* (2006.01)
*H02K 15/02* (2006.01)
*H02K 1/16* (2006.01)

(52) U.S. Cl.
CPC ........... *H02K 15/024* (2013.01); *H02K 1/165* (2013.01); *Y10T 29/49009* (2015.01)

(58) Field of Classification Search
CPC .............. B60L 2220/14; H02K 15/024; H02K 16/025; H02K 1/16; H02K 3/12;
(Continued)

(56) References Cited

U.S. PATENT DOCUMENTS 4,489,249 A * 12/1984 Olivier ..................... H02K 1/24
                                                  310/216.011
8,183,735 B2 * 5/2012 Yanagisawa ........... H02K 1/265
                                                  310/216.071
(Continued)

FOREIGN PATENT DOCUMENTS

CN      101557128 A    10/2009
DE        4302901 A1    9/1993
(Continued)

OTHER PUBLICATIONS

European Search Report dated Sep. 20, 2019 for Application No. 19160279.6.

*Primary Examiner* — Thiem D Phan
(74) *Attorney, Agent, or Firm* — Schmeiser, Olsen & Watts LLP

(57) ABSTRACT

Provided is a method of manufacturing a stator or a rotor of an electrical machine, the steps of: modelling a plurality of model segments circumferentially joined together in such a way that two circumferentially adjacent model segments contacts each other at respective circumferential interfaces, the plurality of model segments including a plurality of model teeth interposed between a plurality of slots, manufacturing the segmented body in such a way that at least the two end slots are circumferentially shifted away from the circumferential interfaces of the respective model segment for creating respective gap portions of the circumferential gap, the sum of the circumferentially shifts of the at least two end slots being equal to the sum of the circumferential extensions of the gap portions, circumferentially joining the plurality of segments together in such a way that two gap portions of two adjacent segments forms the respective circumferential gap.

5 Claims, 3 Drawing Sheets

(58) Field of Classification Search
CPC .......... H02K 3/28; H02K 1/148; H02K 1/165;
H02K 41/03; H02K 51/00; H02K 7/1838;
Y10T 29/49009; Y10T 29/49078
USPC ....... 29/596, 598, 602.1, 604, 606, 732, 738
See application file for complete search history.

(56) References Cited

U.S. PATENT DOCUMENTS

| | | |
|---|---|---|
| 2009/0256431 A1 | 10/2009 | Stiesdal |
| 2013/0000455 A1 | 1/2013 | Kaiser |
| 2013/0200742 A1 | 8/2013 | Seki et al. |
| 2014/0028138 A1 | 1/2014 | Feher et al. |
| 2014/0300242 A1 | 10/2014 | Honda |
| 2016/0094098 A1 | 3/2016 | Maekawa et al. |

FOREIGN PATENT DOCUMENTS

| | | |
|---|---|---|
| DE | 102011006918 A1 | 10/2012 |
| DE | 102012218795 A1 | 5/2013 |
| EP | 2590301 A1 | 5/2013 |
| JP | S61258636 A | 11/1986 |
| JP | H05236681 A | 9/1993 |
| JP | 2001231192 A | 8/2001 |
| JP | 2011172440 A | 9/2011 |
| JP | 2014204601 A | 10/2014 |
| JP | 2016073092 A | 5/2016 |

\* cited by examiner

MANUFACTURING METHOD FOR A SEGMENTED STATOR OR ROTOR OF AN ELECTRICAL MACHINE

CROSS-REFERENCE TO RELATED APPLICATIONS

This application claims priority to European Application No. 19160279.6, having a filing date of Mar. 1, 2019, the entire contents of which are hereby incorporated by reference.

FIELD OF TECHNOLOGY

The following relates to a manufacturing method for a segmented stator or rotor of an electrical machine, i.e. a stator or a rotor including a plurality of stator segments circumferentially joined together. More particularly the following relates to such a stator or rotor.

BACKGROUND

In large electrical machines, segmentation of the stator and/or the rotor structure is required to ease manufacturing and transportation. This is in particular required for stators or rotors where a winding is provided. Due to manufacturing tolerances and limitations as well as to ease assembly, tolerance circumferential gaps are typically designed between segments.

The presence of the segment circumferential gaps can lead to differences in the electromagnetic performance compared to a single stator and often leads to issues with undesirable torque harmonics and output power harmonics of the electrical machine, which can lead to high levels of vibration and acoustic noise as well as losses and complicated control. It is therefore important to control the shape and dimensions of the circumferential gaps in order to minimize the detrimental effect on the performance introduced by the segmentation.

For electrical machines with half teeth at the circumferential ends of the segments (typically integral slot electrical machines with distributed windings), the segment circumferential gaps can be controlled in shape and dimensions by conveniently shaping and dimensioning the half teeth. This has no detrimental effects on the area of slot used for housing the copper windings and therefore the torque and output power of the electrical machine is not affected.

For electrical machines where a half slot is present at each circumferential end of a segment (typically fractional slot machines with concentrated windings), the slot cannot be modified, for example by decreasing them in width, as this would reduce the area for the windings. A reduction in winding area would increase the resistance in this particular coil and therefore increase the loss. By having an imbalance in losses between the coils, a hot spot would be expected to form in the circumferential end coil, thus limiting the operating point of the whole machine from a thermal perspective.

SUMMARY

An aspect relates to a new method of manufacturing a stator or a rotor of an electrical machine, for controlling the shape and dimensions of the circumferential gaps in segmented stators or rotors having half slots at the circumferential ends of the segments, in order to minimize the detrimental effects above described.

According to embodiments of the invention, there is provided a method of manufacturing a stator or a rotor of an electrical machine, the stator or rotor including a plurality of segments circumferentially joined together in such a way that a circumferential gap is interposed between two circumferentially adjacent stator segments.

According to embodiments of the present invention, the presence of the circumferential protrusion leads to a reduction in certain cogging and loaded torque harmonics, as well as in the voltage and power harmonics. Each segment includes a segment body circumferentially extending about a longitudinal axis of the stator segment between a first circumferential end and a second circumferential end. The segmented body includes: a plurality of teeth protruding from a yoke of the segment body, the plurality of teeth being circumferentially distributed between two end teeth of the plurality of teeth, the plurality of teeth comprising at least one intermediate tooth circumferentially comprised between the end teeth, a plurality of slots, circumferentially interposed between the teeth of the stator, the plurality of slots being circumferentially distributed between two end slots, each end slot being circumferentially comprised between a respective end tooth and a respective circumferential end, the plurality of slots comprising at least an intermediate slot circumferentially comprised between the two end slots, the plurality of slots, the method including the steps of:

modelling a plurality of model segments circumferentially joined together in such a way that two circumferentially adjacent model segments contacts each other at respective circumferential interfaces, the plurality of model segments including a plurality of model teeth interposed between a plurality of slot, manufacturing the segmented body in such a way that at least the two end slots are circumferentially shifted away from the circumferential interfaces of the respective model segment for creating respective gap portions of the circumferential gap, the sum of the circumferentially shifts of the at least the two end slots being equal to the sum of the circumferential extensions of the gap portions, circumferentially joining the plurality of segments together in such a way that two gap portions of two adjacent segments forms the respective circumferential gap.

According to embodiments of the invention, in the step manufacturing the segmented body each slot is circumferentially shifted away from the respective circumferential interface of the respective model segment which is closer to the slot, the sum of the circumferentially shifts of the slots being equal to the sum of the circumferential extensions of the gap portions.

According to an embodiment of the invention, each tooth circumferentially extends between two respective side faces and in the step of manufacturing and in the step of manufacturing the segmented body the circumferential widths of the end teeth are reduced on both sides faces and the end teeth are circumferential shifted away from the respective circumferential interface in order that the slots widths are kept equal to the model slots, the sum of the reduction of the circumferential widths and of the shifts of the end teeth being equal to the sum of the circumferential extensions of the gap portions.

With reference to known embodiments where the tooth thicknesses are reduced and all the teeth are consequently shifted, this embodiment limits the change in coil pitch to magnet pitch ratio, therefore limiting the levels of torque and power harmonics (particularly the second and the fourth harmonic).

According to another embodiment of the invention, each tooth circumferentially extends between two respective side faces and in the step of manufacturing the segmented body the circumferential width of each end tooth is reduced by circumferentially shifting away from the respective circumferential interface the respective side face being closer to the respective circumferential interface, the sum of the circumferentially shifts of the side faces being equal to the sum of the circumferential extensions of the gap portions This embodiment limits the levels of torque and power harmonics (particularly the second and the fourth harmonic) at the same time limiting the modification to be performed on the segment with respect to the model segment.

According to a further embodiment of the invention, the method includes the further step of dividing each model segments in two halves, each half model segment circumferentially extending between a respective circumferential interface and a circumferential middle section intermediate between the two circumferential interfaces, each slot of each half model segment being shifted by shifting a side face of a respective tooth, the side face being oriented towards the respective circumferential interface.

This embodiment further limits the levels of torque and power harmonics (particularly the second and the fourth harmonic) with respect to the one previously described.

The aspects defined above and further aspects of embodiments of the present invention are apparent from the examples of embodiment to be described hereinafter and are explained with reference to the examples of embodiment. The embodiments of the invention will be described in more detail hereinafter with reference to examples of embodiment but to which embodiments of the invention is not limited.

BRIEF DESCRIPTION

Some of the embodiments will be described in detail, with references to the following Figures, wherein like designations denote like members, wherein.

DETAILED DESCRIPTION

Figure 1:
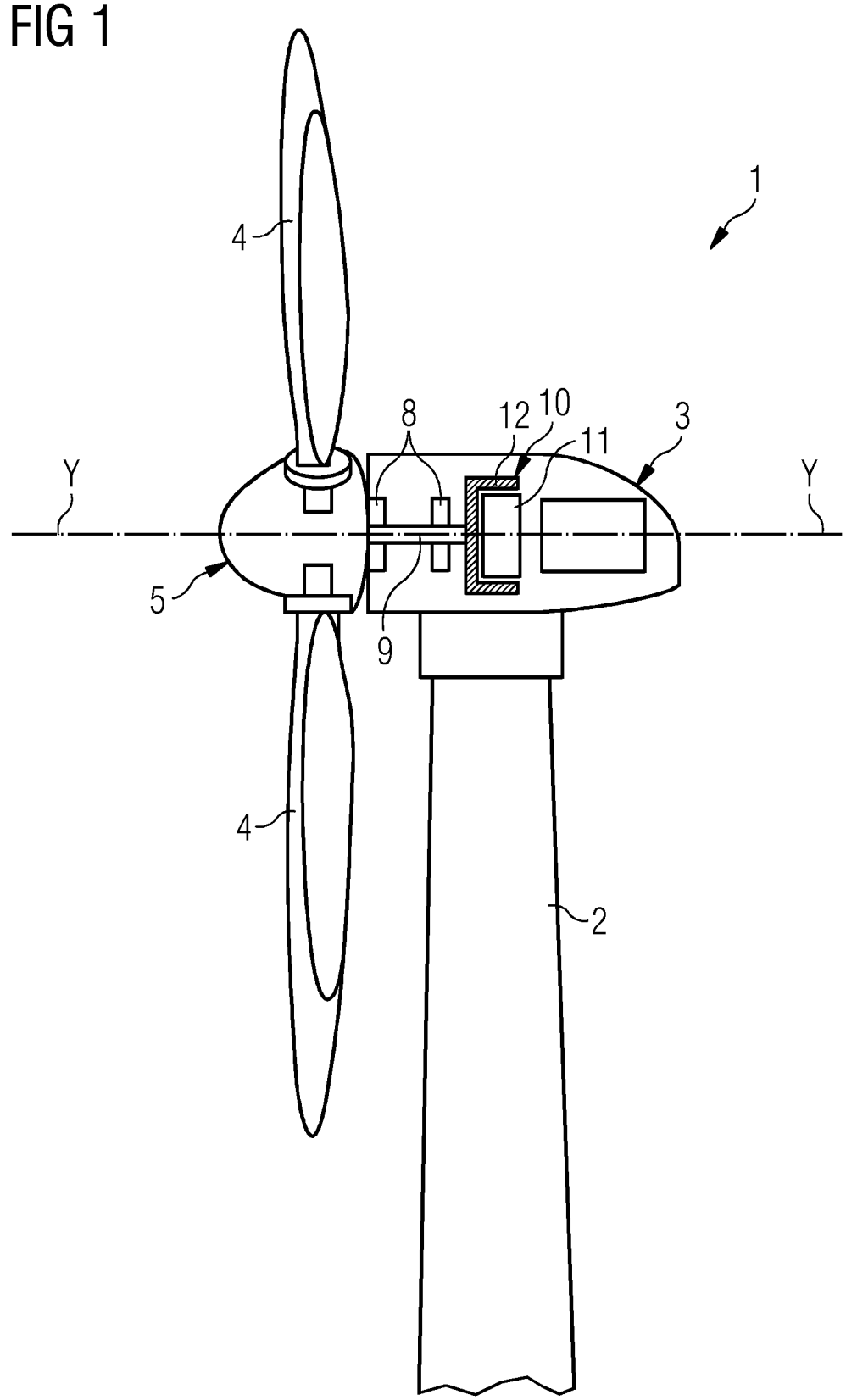
FIG. 1 shows a schematic section of a wind turbine including an electrical generator with a stator geometry manufactured according to the method of embodiments of the present invention.

FIG. 1 shows a wind turbine 1 according to embodiments of the invention. The wind turbine 1 comprises a tower 2, which is mounted on a nondepicted foundation. A nacelle 3 is arranged on top of the tower 2. The wind turbine 1 further comprises a wind rotor 5 having two, three or more blades 4 (in the perspective of FIG. 1 only two blades 4 are visible). The wind rotor 5 is rotatable around a rotational axis Y. When not differently specified, the terms axial, radial and circumferential in the following are made with reference to the rotational axis Y.

The blades 4 extend radially with respect to the rotational axis Y. The wind turbine 1 comprises a concentrated winding electrical generator 10. The wind rotor 5 is rotationally coupled with the electrical generator 10 by a rotatable main shaft 9. According to other possible embodiments of the present invention (not represented in the attached figures), the wind rotor 5 is rotationally coupled directly with the electrical generator 10 (direct drive generator configuration). A schematically depicted bearing assembly 8 is provided in order to hold in place the rotor 5. The rotatable main shaft 9 extends along the rotational axis Y. The permanent magnet electrical generator 10 includes a stator 11 and a rotor 12. The rotor 12 is radially external to the stator 11 and is rotatable with respect to the stator 11 about the rotational axis Y. According to other embodiments of the present invention (not shown) the rotor is radially internal to the stator 11.

According to other possible embodiments of the present invention (not represented in the attached figures), embodiments of the present invention can be applied to any electrical generator or motor which has concentrated winding topology, for example geared drive trains or electrical machine of the synchronous or asynchronous types. According to other possible embodiments of the present invention (not represented in the attached figures), embodiments of the present invention can be applied to any electrical generator or motor which has a double-layer coil distributed winding.

Figure 3:
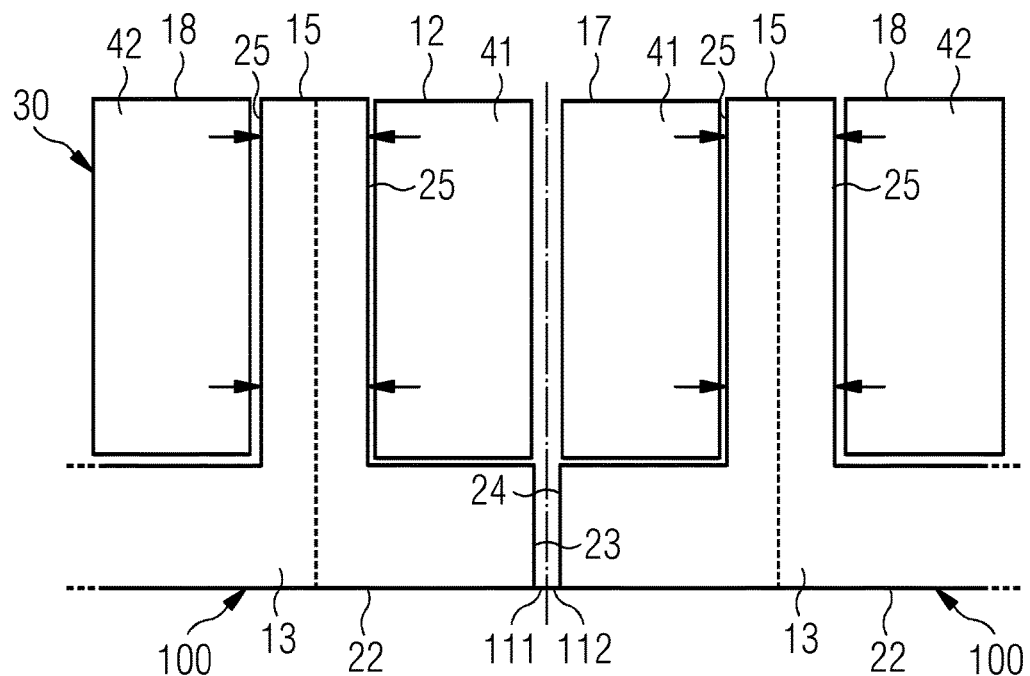
FIG. 3 shows a partial schematic cross section of a first embodiment of a stator for an electrical generator obtained with embodiments of the present invention.
Figure 4:
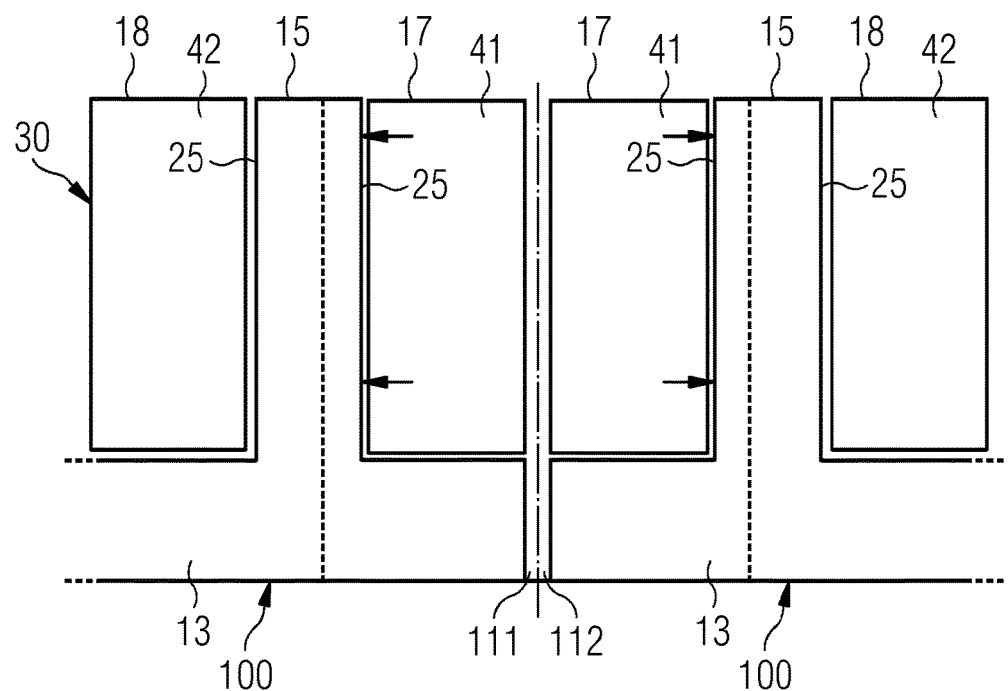
FIG. 4 shows a partial cross section of a second embodiment of a stator for an electrical generator obtained with embodiments of the present invention.
Figure 5:
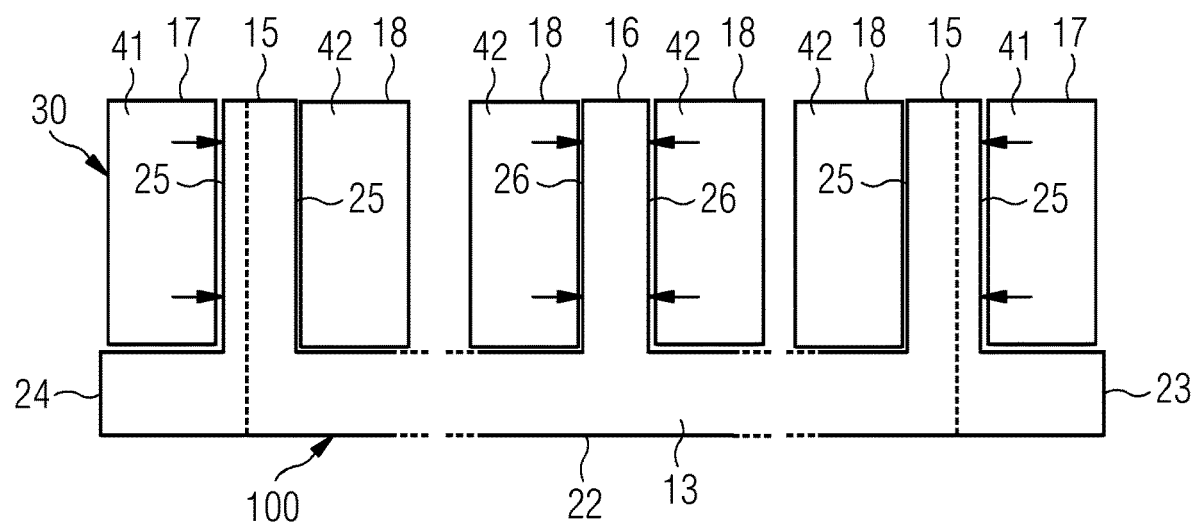
FIG. 5 shows a partial cross section of a third embodiment of a stator for an electrical generator obtained with embodiments of the present invention.

With reference to FIGS. 3 to 5, the stator 11 includes a plurality of circumferential segments 100 (two segment 100 are shown in FIGS. 3 and 4), which are circumferentially joined together in such a way that a circumferential gap 111, 112 is interposed between two circumferentially adjacent stator segments 100. The stator 11 has a toothed structure for housing a coil winding 30 arranged in each of the stator segments 100.

According to other possible embodiments of the present invention (not represented in the attached figures), embodiments of the present invention and the description which follows is applied to a rotor of an electrical machine.

Each segment 100 includes a segment body 22 circumferentially extending about the longitudinal axis Y between two circumferential ends 23. The segment body 22 includes a yoke 13, a plurality of teeth 15, 16 and a plurality of slots 17, 18. Each tooth 15, 16 protrudes from the yoke 13 according to a radial direction orthogonal to the longitudinal axis Y. The plurality of teeth 15, 16 is circumferentially distributed between two end teeth 15 of the plurality of teeth 15, 16. Each end tooth 15 circumferentially extends between two respective side faces 25. The plurality of teeth 15, 16 comprises at least one intermediate tooth 16 (two intermediate teeth 16 for each segment 100 are shown in FIGS. 3 to 5) circumferentially comprised between the end teeth 15. Each intermediate tooth 16 circumferentially extends between two respective side faces 26. The plurality of slots 17, 18 are circumferentially interposed between the teeth 15, 16 and circumferentially distributed between two end slots 17. Each end slot 17 is circumferentially comprised between a respective end tooth 15 and a respective circumferential end 23 of the segment body 22. The plurality of slots 17, 18 comprise a plurality of intermediate slots 18 (two complete intermediate slot 18 for each segment 100 are shown in FIG. 2) circumferentially comprised between the two end slots 17.

The coil winding 30 includes two side coils 41 respectively housed in the end slots 17 and two coils 42 in each of the intermediate slots 18. Each of the side coils 41 and of the coils 42 extends radially from the yoke towards the radial external end of the respective slot 17, 18, i.e. towards the circumferential air gap 19. According to possible embodiments of the present invention, the coil winding 30 may by a coil concentrated winding or a double-layer coil distributed winding.

Figure 2:
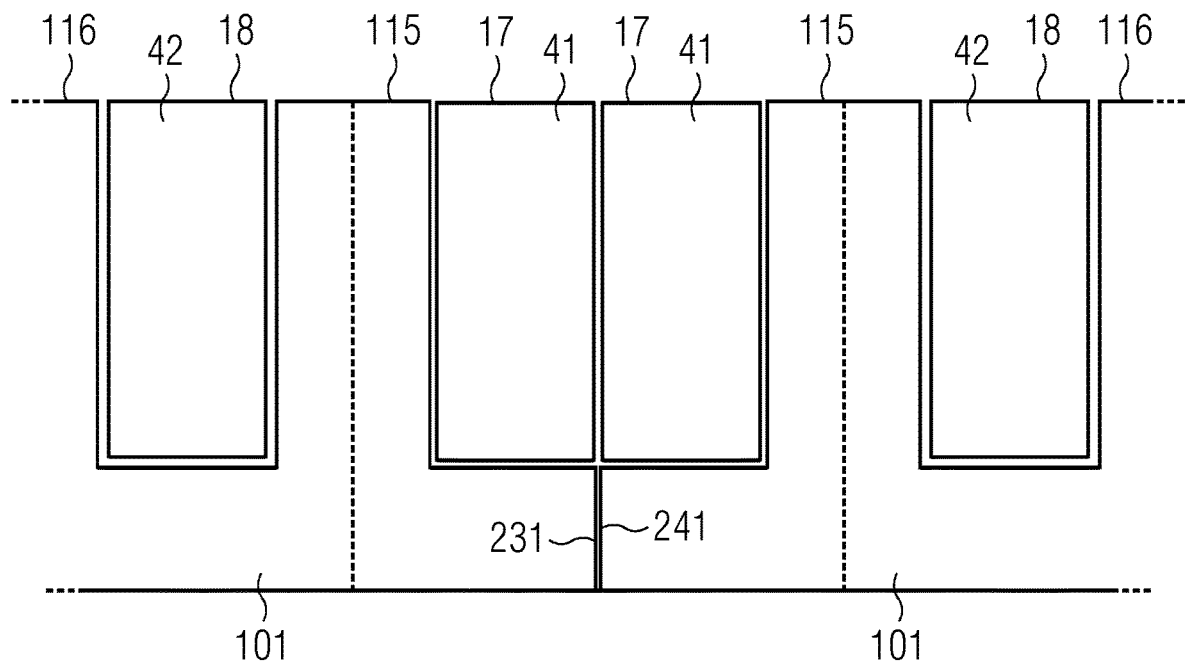
FIG. 2 shows a partial schematic cross section of an electrical generator in accordance with an intermediate step of the method of embodiments of the present invention.

FIG. 2 shows a plurality of ideal model segments 101 circumferentially joined together in such a way that two circumferentially adjacent model segments contacts each other at respective circumferential interfaces 231, 241, the plurality of model segments 101 including a plurality of model teeth 115, 116 interposed between a plurality of slots 17, 18. The model teeth 115, 116 have all the same circumferential width. Two adjacent ideal model segments 101 have no circumferential gap interposed between them. The ideal model segments 101 may be modified according to the method of embodiments of the present invention to obtain the segments 100 in FIGS. 3 to 5.

According to the method of embodiments of the present invention, the segmented body 22 is manufactured in such a way that at least the two end slots 17 are circumferentially shifted away from the circumferential interfaces 231, 241 of the respective model segment 101 for creating, at each circumferential interface, respective gap portions of the circumferential gap 111, 112, the sum of the circumferentially shifts of the at least two end slots 17 being equal to the sum of the circumferential extensions of the gap portions 111, 112. After that, the plurality of segments 100 are circumferentially joined together in such a way that two gap portions 111, 112 of two adjacent segments 100 forms the respective circumferential gap 111, 112.

In the embodiment of FIG. 3, in the step of manufacturing the segmented body 22 the circumferential widths of the end teeth 15 are reduced on both sides faces 25, 26 (as schematically represented by the arrows in FIG. 3) and the end teeth are circumferential shifted away from the respective circumferential interface 231, 241 in order that the slots widths are kept equal to the widths of the model slots. The sum of the reduction of the circumferential widths and of the shifts of the end teeth 15 is equal to the sum of the circumferential extensions of the gap portions 111, 112.

In the embodiment of FIG. 4, in the step of manufacturing the segmented body 22 the circumferential width of each end tooth 15 is reduced by circumferentially shifting away from the respective circumferential interface 231, 241 the respective side face 25 (as schematically represented by the arrows in FIG. 4), which is closer to the respective circumferential interface 231, 241. The sum of the circumferential shifts of the side faces 25 is equal to the sum of the circumferential extensions of the gap portions 111, 112.

In the embodiment of FIG. 5, in the step of manufacturing the segmented body 22 each slot 17, 18 is circumferentially shifted away from the respective circumferential interface 231, 241 of the respective model segment 101, which is closer to the circumferential interface 231, 241. To perform such result the method may include the further step of dividing each model segments 101 in two halves, each half model segment circumferentially extending between a respective circumferential interface 231, 241 and a circumferential middle section intermediate between the two circumferential interfaces 231, 241. Each slot 17, 18 of each half model segment is shifted by shifting a side face 25, 26 (as schematically represented by the arrows in FIG. 5) of a respective tooth, the side face 25, 26 being oriented towards the respective circumferential interface 231, 241.

In the above described embodiments according to FIGS. 3 to 5, the coils 41, 42 in the slots 17, 18 are unchanged with respect to the ideal case in FIG. 2.

Although the present invention has been disclosed in the form of preferred embodiments and variations thereon, it will be understood that numerous additional modifications and variations could be made thereto without departing from the scope of the invention.

For the sake of clarity, it is to be understood that the use of 'a' or 'an' throughout this application does not exclude a plurality, and 'comprising' does not exclude other steps or elements.

The invention claimed is:

1. A method of manufacturing a stator or a rotor of an electrical machine, the stator or rotor including a plurality of segments circumferentially joined together in such a way that a circumferential gap is interposed between two circumferentially adjacent stator segments, each segment including a segment body circumferentially extending about a longitudinal axis of the stator segment between a first circumferential end and a second circumferential end, the segmented body including:

a plurality of teeth protruding from a yoke of the segment body, the plurality of teeth being circumferentially distributed between two end teeth of the plurality of teeth, the plurality of teeth comprising at least one intermediate tooth circumferentially including between the end teeth, a plurality of slots, circumferentially interposed between the teeth of the stator, the plurality of slots being circumferentially distributed between two end slots, each end slot being circumferentially having between a respective end tooth and a respective circumferential end, the plurality of slots including at least an intermediate slot circumferentially including between the two end slots, the plurality of slots the method including the steps of:

modelling a plurality of model segments circumferentially joined together in such a way that two circumferentially adjacent model segments contacts each other at respective circumferential interfaces, the plurality of model segments including a plurality of model teeth interposed between a plurality of slots, manufacturing the segmented body in such a way that at least the two end slots are circumferentially shifted away from the circumferential interfaces of the respective model segment for creating respective gap portions of the circumferential gap, the sum of the circumferentially shifts of the at least two end slots being equal to the sum of the circumferential extensions of the gap portions, circumferentially joining the plurality of segments together in such a way that two gap portions of two adjacent segments forms the respective circumferential gap.

2. The method as claimed in claim 1, wherein each tooth circumferentially extends between two respective side faces and in the step of manufacturing the segmented body the circumferential width of each end tooth is reduced by circumferentially shifting away from the respective circumferential interface the respective side face being closer to the respective circumferential interface, the sum of the circumferential shifts of the side faces being equal to the sum of the circumferential extensions of the gap portions.

3. The method as claimed in claim 2, wherein in the step of manufacturing the segmented body the circumferential widths of the end teeth are reduced on both sides faces and the end teeth are circumferentially shifted away from the respective circumferential interface in order that the slots widths are kept equal to the model slots, the sum of the reduction of the circumferential widths and of the shifts of the end teeth being equal to the sum of the circumferential extensions of the gap portions.

4. The method as claimed in claim 1, wherein in the step of manufacturing the segmented body each slot is circumferentially shifted away from the respective circumferential interface of the respective model segment which is closer to the respective circumferential interface, the sum of the circumferential shifts of the slots being equal to the sum of the circumferential extensions of the gap portions.

5. The method as claimed in claim 4, wherein the method includes the further step of dividing each model segments in two halves, each half model segment circumferentially extending between a respective circumferential interface and a circumferential middle section intermediate between the two circumferential interfaces, each slot of each half model segment being shifted by shifting a side face of a respective tooth, the side face being oriented towards the respective circumferential interface.

\* \* \* \* \*